June 19, 1962     H. H. PLATT     3,039,719
VERTICAL TAKE-OFF AIRPLANE
Filed Nov. 16, 1956     2 Sheets-Sheet 1
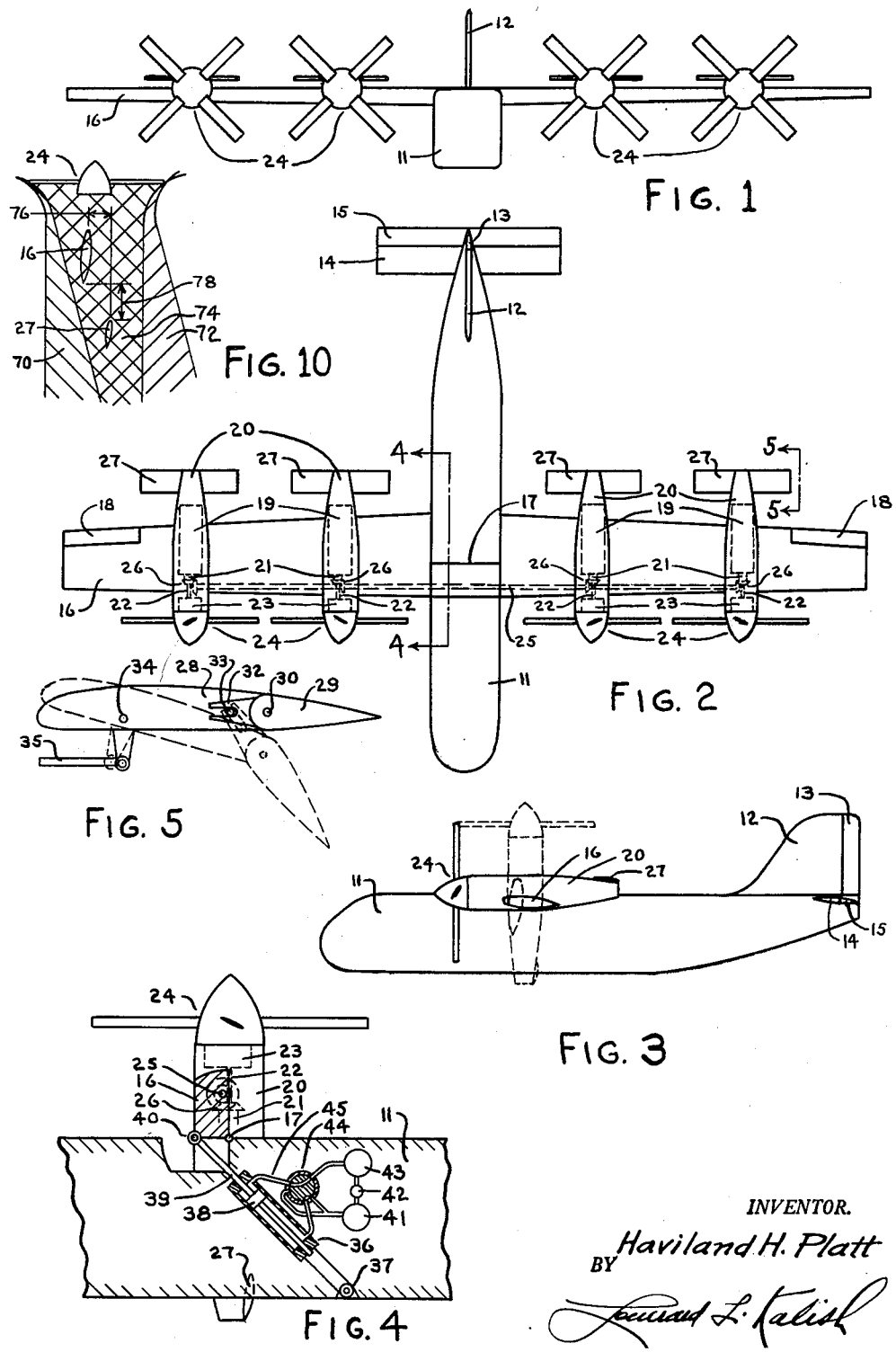
INVENTOR.
BY Haviland H. Platt

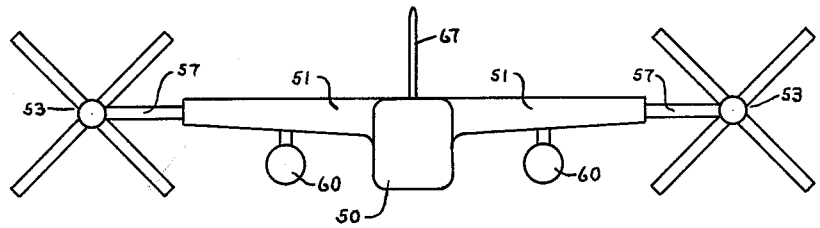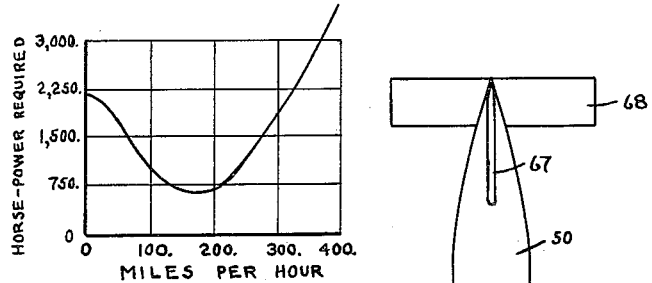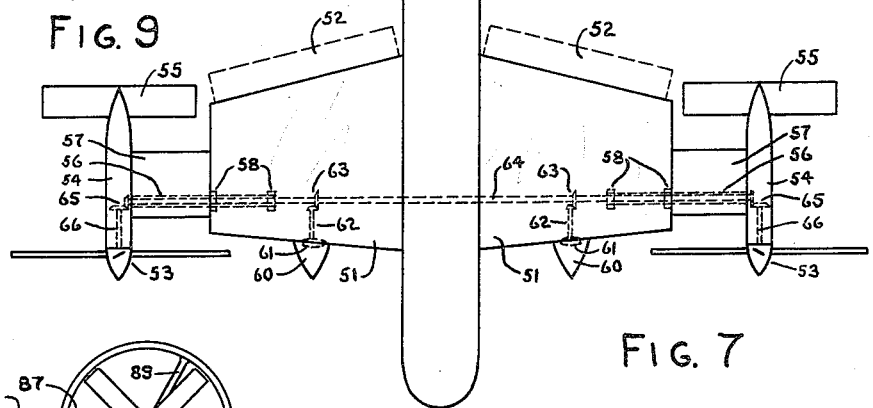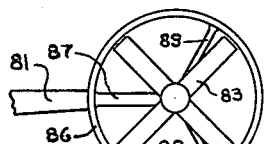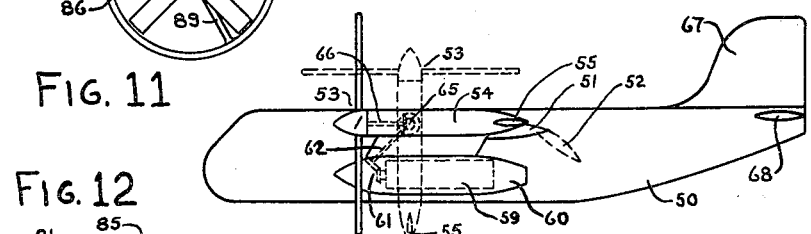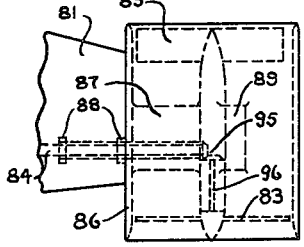

United States Patent Office 3,039,719
Patented June 19, 1962

3,039,719
VERTICAL TAKE-OFF AIRPLANE
Haviland H. Platt, 19 E. 53rd St., New York, N.Y.
Filed Nov. 16, 1956, Ser. No. 622,605
7 Claims. (Cl. 244—7)

My invention relates to airplanes which have the capability of rising vertically and proceeding forward at high speed, and more particularly to vertical take-off airplanes in which conversion from vertical to high-speed horizontal flight is attained by tilting their propellers from a position with generally vertical axis to one with generally horizontal axis.

An airplane of the type referred to above is the subject of my United States Patent No. 2,702,168 in which there is disclosed an airplane having wings fixed to the fuselage and propellers tiltable relative to the wings and the fuselage. The airplane there described contemplates the use of high power loadings, comparable to those customary in helicopter practice, and consequently the propellers must be of large diameter relative to the wing dimensions. Only a small portion of the disc area swept by the propellers is therefore over the wings during the vertical phase of flight. The loss of lift due to interference between the propellers and the wings is therefore of minor consequence.

Now, however, the perfection of the turbine engine of much lower weight per horse-power than that of engines previously available has made possible a great reduction in power loading, with proportionate reduction in propeller dimeter and increase in forward speed. The performance possibilities of vertical take-off airplanes of low power loadings have recently been investigated by agencies of the United States Government and the tilting-propeller type is particularly covered in the reports of the National Advisory Committee for Aeronautics, TN–3304 TN–3630, which show that such aircraft are basically feasible.

However, with the reduction of propeller diameter consequent on decreased power loading the propeller-wing interference becomes much more objectionable. In the models tested by the National Advisory Committee for Aeronautics this difficulty is avoided by arranging the wing to tilt with the propellers. The tilt-wing type is also the subject of my copending application Serial No. 509,438, now abandoned.

When rigid propellers are used, however, as the wing and propellers are tilted forward, a very severe moment opposing tilting is developed by the aerodynamic action. In the model tests reported in TN–3304 this moment was found to be so strong as to be probably beyond the practical range of controllability afforded by trailing edge flaps on the wing or by gravity-resisted moments applied from the fuselage, as proposed in Patent No. 2,702,168. This conclusion is confirmed by tests reported in report TN–3745 of the National Advisory Committee for Aeronautics which show that it was possible to fly a model with trailing edge flap tilt control, but only with the use of extreme center of gravity and control displacements. It has been previously proposed to provide the necessary additional reactive moment by auxiliary means such as a propeller or jet at the tail. Such devices are however undesirable in that they waste power, add weight, add complexity and reduce forward speed. Articulated or feathering propeller blades, as described in application serial No. 509,438, now abandoned, and in Patent No. 2,702,168, and as well known in the art, are also capable of eliminating the adverse moments but are objectionable for the same reasons as are the auxiliary control propellers and jets.

An object of the present invention is to provide instrumentalities and arrangements which shall be capable of overcoming the adverse tilting moment of rigid propellers while at the same time avoiding power losses in auxiliary control devices and giving rise to only very small increases in weight, complexity and drag.

Another object, dependent on realization of the first, is the provision of an airplane which shall have performance in all phases of flight substantially equal to that of conventional airplanes and which shall nevertheless be capable of rising and descending vertically so as avoid the need of long runways for take-off and landing.

Still other objects are those of providing ease of control in all phases of flight and safety in emergencies.

With these and other objects in view, as will appear more fully from the following detailed description, the main novel features of my construction consist of:

(1) An aerodynamic lifting surface pivoted to the fuselage for tilting relative thereto;

(2) One or more propellers mounted on the tiltable surface in fixed relation thereto;

(3) Control surfaces independent of the lifting surfaces adapted to cooperate with the slipstream of the propellers to provide moments tending to tilt the lifting surfaces;

(4) Means within the fuselage capable optionally of providing additional tilting moments, allowing tilting freedom for the lifting surfaces, applying damping to the tilting motion, or locking the lifting surfaces in any desired position relative to the fuselage;

(5) Optional means for augmenting the effectiveness of the control surfaces;

(6) Alternative means for providing two lifting surfaces differentially tiltable with their propellers so as to furnish a still further favorable tilt moment balance and to afford augmented control effectiveness;

(7) Alternative means which apply the propeller drive shaft torque reaction to cause a tilting tendency opposed to the adverse tilting moment, thereby still further improving the tilt moment balance.

In the accompanying drawings, in which like reference characters indicate like parts, I have illustrated in a general way two alternative forms of construction embodying the above structural and functional characteristics, although it is to be understood that the instrumentalities of which my invention consists can be variously organized and that my invention is not limited to the precise forms herein described.

Thus,

FIGURE 1 represents a front outline elevation of an airplane of my novel construction having four propellers, in position for forward flight.

FIGURE 2 represents a plan outline view corresponding to FIGURE 1, the disposition of the four power plants and the propeller driving instrumentalities being also indicated.

FIGURE 3 represents a side outline elevation corresponding to FIGURES 1 and 2, the relative position in vertical flight of the wing, power-plants and propellers being also indicated.

FIGURE 4 represents a fragmentary and diagrammatic cross sectional elevation to an enlarged scale generally on line 4—4, FIGURE 2, with the wing and propellers tilted to the vertical flight position, showing particularly one arrangement for controlling the tilt of the wing.

FIGURE 5 represents a diagrammatic elevational view to an enlarged scale on line 5—5, FIGURE 2, illustrating an optional arrangement of the control surfaces for augmenting their effectiveness.

FIGURE 6 represents a front elevational outline view of an optional form of airplane embodying my invention, having two propellers, fixed stub wings carrying two power-plants in pods, and tiltable wing tips carrying the propellers.

FIGURE 7 represents a top plan outline view corresponding to FIGURE 6, showing also the arrangements of the wing tip supporting pivots and the propeller drive.

FIGURE 8 represents a side elevational outline view corresponding to FIGURES 6 and 7, illustrating also the relative position of the propellers when the airplane is flying vertically, and also the location and drive connections of the power-plants.

FIGURE 9 is a graphical presentation of the flight performance of a specific example of an airplane of my novel construction in terms of horse-power required to maintain level flight at various forward flight speeds.

FIGURE 10 is a diagrammatic representation of the airflows over the wings and control surfaces during the transition from vertical to forward flight of the aircraft illustrated in FIGURES 1 to 4.

FIGURE 11 is a fragmentary front elevation corresponding to FIGURE 6 of an alternate form of the invention in which shrouded propellers are used.

FIGURE 12, corresponding to FIGURE 7, shows a plan view of the arrangement with shrouded propellers.

In the form of airplane of my novel construction illustrated in FIGURES 1, 2 and 3 the fuselage is generally designated by the numeral 11. It may be constructed in any suitable form and of any suitable materials in accordance with current practice in the art. Any suitable landing gear may be provided, the landing gear being presumed to be retracted into the fuselage 11 and therefore not appearing in the drawings.

The fuselage 11 is provided at the tail with a vertical stabilizing fin 12 to which may be pivoted a rudder 13. Also mounted on the fuselage 11 is the horizontal stabilizer 14, which may be all movable for adjustment or may be fitted with an elevator 15 of conventional design.

A suitable wing structure 16 is formed in three portions: two wings and a central connecting portion which is pivoted at 17 to the fuselage 11. The wing structure 16 is thus tiltable relative to fuselage 11 through more than a right angle, as illustrated particularly in FIGURES 3 and 4. The fuselage 11 is recessed to receive the central portion of the wing structure 16 so as to form a substantially flush and unbroken conotur when the wing structure 16 is tilted to the forward flight position. Ailerons 18 of conventional design may be provided at the wing tips.

Turbine engines 19 are mounted on wing 16 and are enclosed, for aerodynamic cleanness, in nacelles 20. The engines 19 are connected, through overrunning clutches 21 and short shafts 22, to reduction gear boxes 23 of conventional design arranged to drive propellers 24, which are also of conventional design and are equipped with the usual pitch adjusting and regulating mechanism. All the high speed drive shafts 22 are interconnected through cross shaft 25 and bevel gear pairs 26, which may be of the hypoid or offset type shown, so as to allow the shafts to pass. Shaft 25 may be equipped with bearings, universal joints, slip couplings and other appointments customary in the art of remote power transmission.

At the trailing ends of the nacelles 20 are mounted control surfaces 27 spaced rearwardly and above the trailing edge of wing 16. The control surfaces 27 are arranged to tilt relative to the wing 16 in response to displacements of flight controls of conventional design at the pilots station, the connecting means being arranged so as not to be affected by the tilting of the wing 16, any conventional interconnections which have this property, such as for example hydraulic or pneumatic tubing, electric cables or the tube-enclosed mechanical push-pulls, being contemplated.

Optionally, to provide more effectiveness, the simple control surfaces 27 may be replaced by the compound form 28 illustrated in FIGURE 5, which is fitted with the automatically deflectable plain flap 29, pivoted to it at 30. The flap 29 has at its leading edge an operationally integral forked extension 32 engaging a pin 33 fixed in relation to the supporting structure of the surface 28 associated with nacelle 20. When surface 28 is displaced about its supporting pivot 34 by motion of its actuating rod 35 to the position indicated by the broken outline, the flap 29 is constrained by the interaction of fork 32 and pin 33 to assume the position relative to surface 28 shown also by the broken outline. Thus the flap is automatically deflected as the control surface is displaced from its neutral position, the effectiveness of the aerodynamic action being thereby amplified.

In FIGURE 4 there is illustrated diagrammatically a provision for assisting in the actuation and control of the tilting of the wing structure 16. This comprises: the hydraulic cylinder 36 pivoted on the fuselage 11 at 37; the piston 38 in cylinder 36; the piston rod 39 pivotally attached to the wing structure 16 at 40; the low pressure accumulator 41; the high pressure accumulator 43; the hydraulic pump 42 for maintaining the desired pressure difference between the two accumulators; the rotary valve 44; and hydraulic ducting 45 interconnecting the ends of cylinder 36 with valve 44, valve 44 with accumulators 41 and 43, and pump 42 with accumulators 41 and 43. In the position shown the upper side of piston 38 is in communication with high pressure accumulator 43 while the lower side is in communication with the low pressure accumulator 41, a moment being thus applied tending to tilt wing structure 16 into its level flight position, as shown in FIGURE 3. A clockwise rotation of the inner element of valve 44 through approximately 120° reverses the connections, placing the lower side of piston 38 in communication with the high pressure accumulator 43 and connecting the upper side thereof to low pressure accumulator 41, the result being a tendency to rotate wing structure 16 into the vertical flight position shown in FIGURE 4. Rotation of the valve element 120° in the counter-clockwise direction connects the upper side of piston 38 with its lower side, thus freeing the tilting of the wing structure 16 of all tilt restraint from the fuselage 11 except for the fluid friction of the hydraulic medium in flowing through the ducts and ports. Turning the valve element to an intermediate position closes all passages and thus locks the wing 16 against all tilting tendencies, while a slight displacement in either direction from the free position imposes a controllable degree of restraint upon freedom of tilt motion, thus affording controllable damping to prevent excessive swinging oscillations of the wing 16 relative to the fuselage 11.

The operation of the airplane shown in FIGURES 1 to 4 is as follows:

When ready for take-off the wing 16 and the propellers 24 are in the relative positions shown in FIGURE 4 and in the dotted outline of FIGURE 3, the thrust of the propellers maintaining them in that position. The valve 44 is at that time preferably placed in the free or damped position. As power is applied to the propellers 24 by engines 19 the airplane rises vertically from the ground. The fuselage 11 then hangs freely from the pivot 17 and if the center of gravity is directly under the pivot 17 its attitude will remain unchanged as it rises, the action being then in accordance with the description in my copending application Serial No. 509,438. If the center of gravity should be displaced from the location directly under pivot 17 due to unbalanced loading, or the like, correction is readily made by means of valve 44. It should be noted in connection with the matter of trim at take-off that the National Advisory Committee for Aeronautics has found in the experiments reported in their report TN–3630 that a tendency exists to raise the stabilizer 14 and so depress the nose due to the spreading out of the air from the propeller slipstreams along the ground. If the fuselage and wing are rigidly connected, as was the case in the reported tests, this effect creates a control difficulty as the airplane rises, since the original nose down tendency disappears as soon as a slight altitude has been attained. A nose down attitude moves the craft forward while a nose up attitude moves it backward. Consequently, as it rises from the ground, it oscillates with a forward and backward displacement unless correct counter control measures are rapidly adopted. Since the control cannot be instantaneous an unsteadiness necessarily takes place which must be disturbing to the passengers. This difficulty is entirely avoided by my construction if the pivot 17 is left free at take-off. A tilt of the fuselage relative to the wing has then no effect on the direction of thrust of the propellers. Consequently, while the fuselage will tend to tilt nose-up as the craft leaves the ground, there will be no fore-and-aft displacement of the fuselage or of the aircraft as a whole. Any pendular oscillation which might occur is readily prevented by a damped setting of valve 44. Normally therefore the trim is adjusted with the center of gravity of the fuselage somewhat aft of pivot 17 so that the fuselage will assume the normal nose-up attitude of climb, to which air travelers are accustomed, as the craft leaves the ground.

While the aircraft is rising and hovering, control is entirely derived from the propeller thrust and from the force of the slipstream of the propellers reacting against the control airfoils 27. Thus, control in vertical flight is effected as follows:

Lateral control by differential change of propeller pitch of one or more propellers on one side relative to those on the other side;

Vertical control by concerted change of pitch and power on all propellers;

Longitudinal control by concerted displacement of all control airfoils 27, producing a moment to tilt the wing and propellers forward or backward. It may be noted that response in longitudinal control is far more sensitive with pivot 17 free than with a rigid attachment of wing to fuselage because in the first case only the wing-engine-propeller masses need to be rotated, while in the second case the fuselage, with far higher moment of inertia, must also be displaced.

Turning control by differential actuation of the control airfoils 27 on opposite sides of the fuselage. In this case no tilt is involved, a turning couple resulting directly from the aerodynamic forces on the airfoils.

The transition to high speed level flight is effected by continued actuation of the longitudinal control in the forward direction. This tilts the wing and propellers forward, with some optional assistance from hydraulic piston 38, causing forward motion of the craft as a whole until the wing assumes the approximate position shown in FIGURE 3, in which position it may be locked by the appropriate setting of the valve 44, or by other suitable means. The airplane then proceeds as a conventional fixed wing airplane. During the conversion the vertical flight controls may be deactivated by any suitable means, whereupon the forward flight control is obtained in conventional airplane manner through ailerons 18, elevator 15 and rudder 13, which are inactive in vertical flight due to the low airspeed over them. Optionally, the ailerons, elevator and rudder may be omitted and control continued with the same instrumentalities as in vertical flight. In the latter case turning control is by differential propeller pitch; rolling control by differential actuation of surfaces 27 and pitching control by concerted actuation of surfaces 27. Either one of the two following expedients must then be adopted: The turning and rolling responses must be reversed during transition by some suitable means; or the pilot must learn to orient by the wing, as he would naturally do if the fuselage were upright at take-off, as is known in some vertical take-off aircraft.

The advantages to be gained from the arrangement of my invention may be illustrated by consideration of a concrete example, such as for instance that computed in National Advisory Committee for Aeronautics report TM 3304. The characteristics of the airplane there considered are as follows:

Weight: 14,700 lbs.
Power required in hovering: 2,220 H.P.
Propeller diameter: 12 ft.

It is developed in the report that to tilt the wings and propellers while moving forward slowly requires a maximum moment of about 17,600 lb. ft. which cannot be provided successfully by any wing and flap arrangement hitherto known.

This difficulty is avoided by the expedient which forms the basis of one phase of my invention. This is by mounting the control surfaces 27 independently of the wing 16 so that they may at all times be turned to the most effective angle relative to the airflow over them, which cannot be done with the wing-flap arrangement because of the fixed relationship between the wing and the propellers.

The effective span of the control surfaces 27 under the critical condition comprises only that portion which is within the propeller slipstream. This is the consideration which has led to the proportions shown in FIGURE 2 in which each of the control surfaces 27 has a span equal to the diameter of the fully contracted slipstream. For the proportions there laid out the effective control area, for the 14,700 lb. example, is 52 sq. ft. and the length of the moment arm about pivot 17 is 6.5 ft. For the plain airfoil control surfaces shown in FIGURES 2 and 3 the maximum unit force attainable for control purposes is substantially equal to the slipstream dynamic pressure, which is well known to be equal to the propeller disc loading, in this case 32.5 lbs. per sq. ft. Thus the moment available for control by surfaces 27 is $$M = 52 \times 32.5 \times 6.5 = 11,000 \text{ lb. ft.}$$

which leaves a deficiency of about 17,600—11,000, or 6,600 lb. ft.

This moment is within the potentiality of the hydraulic piston 38, since an application of this moment will cause the fuselage, with a weight of about 10,000 lbs. to tilt in the nose-up direction through an angle of about 11°. Consequently it is seen that with the combined use of flaps 27 and the hydraulic piston 38 the transition from vertical flight to horizontal flight can be effected, although with a fuselage attitude change undesirably close to the limit of tolerability.

However, in accordance with well known aerodynamic principles, the compound arrangement of control surfaces illustrated in FIGURE 5 makes available approximately twice as much control force as that of the plain surface 27. Consequently, with the compound control surfaces, the control moment available is about 22,000 lb. ft. which provides an ample margin over the requirement, without the need for tilting the fuselage to provide an additional moment.

Thus, as has been shown, the objective of providing a moment sufficient for tilt control is attained by the instrumentalities of my invention illustrated in FIGURES 1 to 5.

While my invention is in no way limited to any particular relative location of control airfoils 27 or 28, certain considerations pointing to an optimum location may be deduced from report TM-3304 of the National Advisory Committee for Aeronautics, referred to above. It is there established that a critical condition with relation to wing tilt control exists at a low forward speed when the wing 16 and propellers 24 have been tilted through a rather small angle. The factors which contribute to make this flight regime critical as to control are the following: the propeller slipstream is swept back due to the forward velocity component of airflow thus tending to move away from control surface 27, the angle of attack on the wing 16 is such as to produce partial stall tending to create separated turbulent flow, and interference of the wing 16 tends to reduce the aerodynamic effectiveness of the control surfaces.

This conditions are illustrated in FIGURE 10. A central longitudinal cross-section through the undeflected slipstream is indicated at 70 and a similar outline of the deflected slipstream at 72. To avoid isolation of control surface 27 in hovering or in slow speed forward flight it is preferably placed well within the doubly cross-hatched area 74, being thus assured of high speed airflow over it throughout the regime of vertical flight and the critical transition.

The relative locations of wing 16 and airfoils 27 or 28 are also important, the stagger distance 76 and the chordwise distance 78 being preferably such as to minimize aerodynamic interference during the critical transition.

In FIGURES 6, 7 and 8 there is illustrated one of a number of possible alternative constructions of my invention. The arrangement shown contemplates the use of two additional principles for augmenting fore-and-aft controllability. These are as follows:

(1) Placing the propellers outboard of the main wing so as to reduce wing-propeller interference, Report TN-3304 referred to above indicating that the moment required to tilt the propellers is substantially cut in half by removal of the wing from behind the propellers;

(2) The application of engine torque to assist in overcoming the adverse tilting moment, this expedient also having the potentiality of cutting in half the aerodynamic tilting moment required.

Other features shown in the arrangement illustrated in FIGURES 6 to 8 are:

The use of two propellers instead of four, advantageous from the point of view of within the limits of practicable propeller dimensions;

Independent titling of the two propellers;

Fixed main wings;

Retractable flaps for augmenting the lift of the wings at low forward speeds;

Two power-plants;

Pod mounting of power-plants for safety, improved trim and reduction of aerodynamic drag.

The use of plain stabilizing surfaces without rudder or elevator, control in all flight phases being derived from the propeller elevators.

In the drawings, the fuselage 50 is fitted with the fixed stub wings 51 having retractable trailing edge flaps 52. The propellers 53 are mounted, sufficiently outboard of wings 51 for their contracted slipstreams substantially to clear the wing tips, on the faired supports 54 which carry, pivoted at their trailing ends, the propeller elevators, or control surfaces, 55. The supports 54 are attached at the ends of the spanwise tubular supports 56 enclosed in the fairings 57 and mounted for free rotation in bearings 58.

The power is supplied by the two turbine engines 59 mounted below the wings 51 in pods 60, the drive to propellers 53 being through gearing 61, shafts 62, gearing 63, cross shaft 64, gearing 65 and shafts 66 to the propellers 53.

The fuselage is fitted with the fixed vertical fin 67 and stabilizer 68.

In operation, the propellers 53 with their supports and stabilizers 54 and 55 are turned in unison to the position shown by the dotted outline in FIGURE 8 by means of the tilting moment afforded by the control of the elevators 55, actuated from the cockpit by means similar to those provided to operate control surfaces 27 of the arrangement of FIGURES 1 to 3, the propeller assemblies being free to rotate in bearings 58.

Power is then applied from engines 59 to raise the airplane vertically from the ground. In the vertical phase of flight control is obtained as follows:

Lateral control by differential pitch change between the two propellers;

Turning control by differential actuation of the propeller elevators 55;

Longitudinal control by concerted actuation of elevators 55;

Vertical control by concerted pitch and throttle change.

In forward flight:

Roll control is obtained by differential actuation of elevators 55;

Yaw control by differential propeller pitch actuation;

And pitching control by concerted actuation of elevators 55.

It may be noted that the controls are more sensitive than those of the arrangement of FIGURES 1 to 5 for two reasons: (a) the wing does not have to be tilted with the propellers, the moment of inertia being thus reduced; and (b) the elevators 55 act at all times except in the tilt transition as servos controlling the direction of application of the propeller thrust vectors. For these reasons, and particularly in view of the reduced tilting moment required, the total control surface area may be materially reduced below that shown in the drawings, reduction of drag and higher top speed being thus favored.

By distributing the required gear reduction from the engines to the propellers among the three sets of gearing on each side, large gears are avoided and the torque at the final gear set 65, which controls the reaction on the fuselage, may be adjusted to assist the propeller tilt action in any amount desired within the limits available. The optimum tilt assistance to be derived from the application of driving torque is approximately one-half the maximum torque resisting tilt. This is so because the torque is also active in hovering flight, when there is no aerodynamic moment. Therefore if the torque induced tilting moment were greater than one-half the maximum aerodynamic moment it would become the controlling factor. In hovering the propeller driving torque must be compensated for by the setting of the elevators 55. The situation is still further complicated by the fact that the force thus generated on the elevators tends to move the aircraft forward. To hover in one spot or rise vertically therefore it is necessary to incline the propeller thrust vectors slightly rearwardly. Furthermore, the driving torque reacts on the fuselage to raise its nose. To prevent excessive fuselag tilt therefore the center of gravity of the fuselage and wing assembly must be considerably lower than the drive shaft 64, as is shown. With the establishment of suitable values for the various parameters involved this effect can be turned to advantage. Thus the torque-induced nose-up tendency may be balanced against the on-the-ground nose-down tendency previously referred to. The aircraft will then have a level attitude on and near the ground and the nose will tilt into the normal climb attitude as the aircraft rises.

An additional advantage of having the main wing fixed is that it is not stalled during the transition as is unavoidably the case with the tilting wing. Consequently the transfer of load from the propellers to the wing takes place more smoothly. The optional use of the trailing edge flaps 52 enables the transition to be completed at a lower forward speed and provides the usual reduction of landing speed in case of an emergency landing as a conventional airplane.

The reduction in propeller tilt moment requirements may be illustrated by a calculation paralleling that made for the tilt-wing configuration.

For the same disc area as the four 12 ft. propellers the two propellers must each have a diameter of 17 ft.

If the propellers were entirely isolated, according to the National Advisory Committee tests, the maximum moment resisting tilt would be 12,500 lb. ft.

Actually the propellers are not totally isolated because of the fairings 57. The actual moment will therefore be slightly greater than the above figure and may estimated at 14,000 lb. ft.

This, as explained above, may be halved by application of drive torque, the net moment to be overcome being then 7,000 lb. ft. The torque reaction depends for a given power directly on the rotational speed of the shaft 64 and the revolutions per minute required to produce the desired torque reaction for the hovering power is readily found from the equation $$R.p.m. = 16{,}500\ H.P./\pi T$$

which yields for the calculated example 1,500 r.p.m. Since a suitable speed for the propellers is 1,000 r.p.m. a final gear reduction at the gear set 65 of 1.5 to 1 provides for the optimum torque reaction.

The moment that can be applied by elevators of the proportions shown is calculated at 13,400 lb. ft. Therefore the arrangement illustrated in FIGURES 6 to 8 is superior to that of FIGURES 1 to 4 in that the tilting moment required can be greatly exceeded without aid from the fuselage. If compound elevators of the type of FIGURE 5 are applied a still larger surplus of moment is available which may be applied to reduce the elevator area.

The same considerations relative to control orientation over the transition range apply to the fixed wing configuration as to the tilt-wing arrangement. Controllable rudder, elevator and ailerons may be added to the fixed wing embodiment of my invention if desired, although it may be noted that control by elevators 55 and propellers 53 remains correctly operative under all forward flight conditions, even with power off, the fairings 57 then acting as ailerons and the propellers continuing to rotate by virtue of the usual provision of overrunning clutches in the engine drives.

The number and location of the engines is optional also. Thus instead of the two engines shown four may be used and the engines may be located in the fuselage or in the wing rather than in pods.

With propeller disc loadings as high as those contemplated for the aircraft described herein autorotative power-off landings with upright propeller axes are not safely feasible. Reliance against the hazards of engine failure is therefore placed in multiplicity of powerplants, as is conventional practice in transport airplanes. In this respect, except for the short periods of take-off and landing, the dangers of engine failure are strictly comparable to those of other airplanes. In other respects the vertical take-off airplane is far safer due to its ability to move slowly in hazardous environments.

FIGURE 9 shows the performance prospects for both arrangements, derived from the National Advisory Committee report referred to above, in terms of power required to maintain level flight over the speed range. It may be noted that with four engines of 750 H.P. each hovering flight may be maintained with three engines, that flight at 60 m.p.h. to 275 m.p.h. is attainable with two engines and that flight may be sustained with only one engine at speeds between 125 m.p.h. and 210 m.p.h. With all four engines the top speed is 375 m.p.h. and with three it is 330 m.p.h. If two engines are used the power should be increased to permit hovering on one engine. The two engines should then be capable of delivering 2,250 H.P. each, the top speed being thereby increased to well over 400 m.p.h. While the fixed wing arrangement does not lend itself readily to the use of more than two propellers it may have any number of engines. In the tilt-wing machine, however, any number of propellers and any number of engines may be used.

In illustrating both arrangements of my invention I have shown propellers of the customary open type. Any other suitable type of propulsion unit may be substituted such as the well-known shrouded propeller and ducted fan types, the arrangement of FIGURES 6, 7 and 8 being particularly well adapted for the use of such devices. Thus, it is well known that propellers of the shrouded type are less subject to tilting moments of the kind hereinbefore described and also that less disc area than that of open propellers is required for equal performance. Consequently an alternative form of my invention contemplates the substitution of shrouded propellers for the open type shown in FIGURES 6, 7 and 8. This variation is illustrated in FIGURES 11 and 12 corresponding to the wing tip and propeller of FIGURE 6 and FIGURE 12 to the same parts in FIGURE 7. The propeller 83, of smaller diameter than 53, is enclosed in the shroud cylinder 86. Shroud 86 is formed integral with shaft fairing 87 and is tiltably mounted in bearings 88 in the tip of wing 81, and is additionally supported by struts 89. Control surface 85, shafts 84 and 96, and gears 95 function in the same manner as do their counterparts of FIGURES 6 and 7.

While I have described and illustrated certain specific embodiments of my invention, it is to be understood that many other variations are possible within its scope, the claims alone serving to define its true breadth.

Having thus described my invention, what I claim as new and desire to secure by Letters Patent is:

1. In an aircraft, a fuselage, a wing pivotally attached to said fuselage, thrust-producing means carried by said wing in fixed relation thereto, said thrust-producing means including a power-plant and producing a slipstream moving in a direction opposite to the direction of the thrust of said thrust-producing means upon said wing, and said slipstream having a velocity substantially greater than the velocity of said wing due to said thrust, a control-surface pivotally connected with said wing and having its leading edge spaced substantially rearwardly of the trailing edge of said wing and being disposed in the aforementioned slipstream, a flap pivoted on said control surface, and means adapted to deflect said flap relative to said control surface in coordination with the deflection of said surface relative to said wing.

2. In an aircraft, a fuselage, a wing pivoted to said fuselage, mechanism in said fuselage connected both to said fuselage and to said wing, adapted to rotate said wing and said fuselage relative to each other about the axis of pivotation between wing and fuselage, and means associated with said mechanism optionally to render said mechanism inoperative so as to permit said wing and fuselage to rotate in relation to each other independently of said mechanism.

3. In an aircraft, a fuselage, a wing pivoted to said fuselage, thrust-producing means carried by said wing in fixed relation thereto, said thrust-producing means including a power-plant and producing a slipstream moving in a direction opposite to the direction of the thrust of said thrust-producing means upon said wing and said slipstream having a velocity substantially greater than the velocity of said wing due to said thrust, a control-surface pivotally connected with said wing and disposed within the aforementioned slipstream, said control-surface being adapted, in conjunction with said slipstream, to produce a moment tending to rotate said wing relative to said fuselage about the axis of pivotation of said wing, mechanism in said fuselage and connected both with said wing and with said fuselage for rotating said wing and fuselage relative to each other, said mechanism including means for optionally rendering said mechanism inoperative so as to permit said wing and said fuselage to be rotated in relation to each other by the aforementioned control surface.

4. An aircraft according to claim 3, including a flap pivoted on the control surface, and means adapted to deflect said flap relative to said control surface in coordination with the deflection of the control surface relative to the wing.

5. In an aircraft, a fuselage, a wing pivoted to said fuselage, a power-plant carried by said wing in fixed relation thereto, a propeller carried by said wing with its axis in fixed relation to said wing, said propeller being operatively connected with said power-plant, to be driven thereby, a control-surface pivotally connected with said wing and being disposed within the slipstream of said propeller, and having its leading edge spaced substantially rearwardly of the trailing edge of said wing, lift-augmenting means associated with said control-surface, and means adapted to actuate said lift-augmenting means in coordination with the deflection of said control-surface relative to said wing.

6. In an aircraft, a fuselage, an airfoil pivoted to said fuselage, a propeller mounted on said airfoil with its axis in fixed relation to said airfoil, a control-surface pivotally connected with said airfoil with its leading edge spaced substantially rearwardly of the trailing edge of said airfoil and being disposed within the slipstream of said propeller, lift-augmenting means associated with said control-surface and means adapted to actuate said lift-augmenting means in coordination with the deflection of said control-surface relative to said airfoil.

7. In an aircraft, a fuselage, a wing pivoted to said fuselage, thrust-producing means carried by said wing in fixed relation thereto, said thrust-producing means including a power-plant and producing a slipstream moving in a direction opposite to the direction of the thrust of said thrust-producing means upon said wing and said slipstream having a velocity substantially greater than the velocity of said wing due to said thrust, a control-surface pivotally connected with said wing and disposed within the aforementioned slipstream, said control-surface being adapted, in conjunction with said slipstream, to produce a moment tending to rotate said wing relative to said fuselage about the axis of pivotation of said wing, mechanism in said fuselage and connected both with said wing and with said fuselage for rotating said wing and fuselage relative to each other, said mechanism including means for optionally varying the direction and magnitude of the force of said mechanism so as to permit said wing and said fuselage to be rotated in relation to each other by the aforementioned control-surface and by said mechanism, respectively, with the direction and magnitude of their respective forces being independently alterable and variable.

References Cited in the file of this patent

UNITED STATES PATENTS

| | | |
|---|---|---|
| 1,786,545 | Noeggerath | Dec. 30, 1930 |
| 1,788,218 | Wettstein | Jan. 6, 1931 |
| 1,788,836 | Junkers | Jan. 13, 1931 |
| 1,845,307 | Maxwell | Feb. 16, 1932 |
| 1,951,817 | Blount | Mar. 20, 1934 |
| 2,252,284 | Child | Aug. 12, 1941 |
| 2,630,986 | Gumbs | Mar. 10, 1953 |
| 2,702,168 | Platt | Feb. 15, 1955 |
| 2,708,081 | Dobson | May 10, 1955 |
| 2,853,256 | Schmidt et al. | Sept. 23, 1958 |

FOREIGN PATENTS

| | | |
|---|---|---|
| 437,447 | Great Britain | Oct. 28, 1935 |
| 793,426 | France | Nov. 23, 1935 |